Oct. 29, 1963 C. R. WILHELMSEN 3,109,103

NONLINEAR SIGNAL-TRANSLATING CIRCUIT

Filed April 1, 1959

United States Patent Office 3,109,103

Patented Oct. 29, 1963

3,109,103

NONLINEAR SIGNAL-TRANSLATING CIRCUIT

Carl R. Wilhelmsen, Huntington Station, N.Y., assignor to Hazeltine Research, Inc., Chicago, Ill., a corporation of Illinois Filed Apr. 1, 1959, Ser. No. 803,500
4 Claims. (Cl. 307—88.5)

This invention pertains to electrical simulation of specified nonlinear relationships, and particularly to electronic circuit means for providing specified nonlinear electrical signal-translation characteristics.

Circuits having specified nonlinear signal-translation characteristics are widely employed in electronic analogue computation equipment for simulating nonlinear conversions involved in actual physical processes. In this way it is possible to determine in advance the effect which a given modification of the physical process will have on the final results. For example, the copending application of W. F. Bailey, Serial No. 854,742 filed November 23, 1959, and assigned to applicant's assignee, describes equipment for producing an electronic color image of the printed reproduction which will be obtained from an original color picture by means of various photochemical color printing operations. Such equipment includes means for effecting electrical signal modifications analogous to the corresponding photochemical operations. In view of the fact that optical density is mathematically equal to the negative logarithm of optical transmission, a good may of those operations involve transfer relationships which over a considerable range resemble a logarithmic or exponential function. Accordingly, electronic circuits capable of providing a specified modification of a logarithmic or exponential signal-translation characteristic are required.

It has been suggested that a logarithmic type nonlinear signal-translation characteristic might be obtained by utilizing the nonlinear voltage versus current, or resistance, characteristic of a semiconductor crystal PN junction diode. However, the resistance characteristic of a given diode is fixed by its construction, so that utilization thereof to obtain an arbitrary nonlinear characteristic different from that of the diode itself has not heretofore been successfully accomplished. In addition, it is often necessary to provide a variety of nonlinear characteristics which depart from the nonlinearity of the diode in various degrees. The obvious approach to such a requirement is to have different nonlinear elements for each of the required characteristics. However, such circuits would be impractical from the standpoint of the elaborate and expensive construction which would be involved.

Accordingly, an object of the invention is to provide a signal-translating circuit which utilizes a resistive element having a particular nonlinear resistance characteristic to obtain a required nonlinear signal-translating characteristic.

A further object is to provide a signal-translating circuit adapted to selectively provide any of a variety of required nonlinear signal-translating characteristics which differ from each other in varying degrees.

A further object is to provide a signal-translating circuit wherein the substantially logarithmic resistance characteristic of a semiconductor PN junction is employed to selectively obtain a variety of required nonlinear signal-translation characteristics.

Pursuant to the foregoing objects, a signal-translating circuit in accordance with the invention comprises an amplifier having an input circuit and an output circuit, and alternating-current signal coupling means comprised in the input circuit for applying an input signal voltage to the amplifier to cause it to produce an output signal voltage across the output circuit. Further means are comprised in the input circuit for establishing a substantially constant reference signal voltage level. A resistive element having a nonlinear resistance characteristic is connected across the output circuit. The novel signal-translating circuit further comprises means connected to the amplifier for controlling the portion of the foregoing nonlinear characteristic over which the resistance of the resistive element varies in response to a predetermined amplitude range of the input signal relative to the reference voltage level. The signal-translating circuit also comprises circuit means connected in the output circuit for modifying the nonlinear resistance characteristic produced thereacross by the resistive element in controllable degree, whereby the output signal will be a nonlinear modification of the input signal in accordance with a nonlinear signal-translation characteristic which is adjustable by the input and the output circuit control means.

Other and further objects of the invention and additional features thereof will be pointed out in the following detailed specification and accompanying drawings, noting however that the actual scope of the invention is pointed out in the appended claims.

Referring to the drawings.

Figure 1:
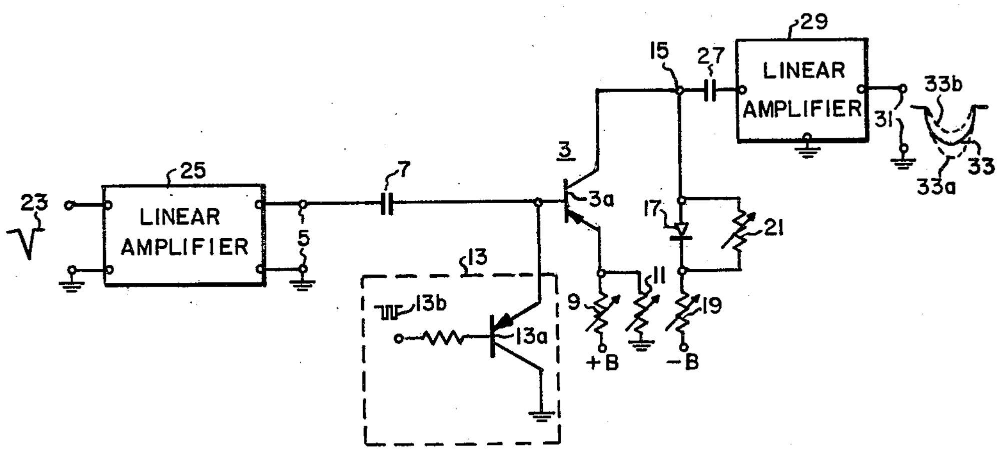
FIG. 1 is a circuit diagram of an embodiment of the invention.

*Construction of FIG. 1 Circuit Embodiment*

The signal-translating circuit illustrated in FIG. 1 comprises an amplifier 3 having an input circuit and an output circuit. Amplifier 3 is illustrated as including a PNP junction transistor 3*a*, although an NPN junction transistor or even a vacuum tube could be employed. However, a transistor amplifier is preferable because of its low power consumption and because it enables the entire circuit to be physically very compact. The input circuit of transistor amplifier 3 may be considered as originating at input terminals 5, one of which is grounded, and includes means for applying an input signal voltage to the amplifier to cause it to produce an output signal voltage across its output circuit. Specifically, such means may include a capacitor 7 for coupling the ungrounded one of input terminals 5 to the base of transistor 3*a*, as well as an adjustable resistor 9 for connecting the emitter to the positive terminal of a source of constant direct voltage relative to ground. Capacitor 7 will, of course, serve to couple alternating-current signals to the base of transistor 3*a* while blocking the D.-C. component thereof. An additional adjustable resistor 11 connecting the emitter to ground and a clamping or D.C. restorer circuit 13 connected between the base and ground may also be considered as part of the foregoing input circuit. The output circuit of amplifier 3 includes its collector, which is connected to a terminal 15, and a source of constant negative direct voltage relative to ground.

The signal-translating circuit of FIG. 1 further comprises a nonlinear resistive element 17 such as a crystal PN semiconductor junction diode connected across the output circuit of amplifier 3 and which has a predetermined nonlinear resistance characteristic. Specifically, diode 17 is connected between output terminal 15 and the negative supply voltage terminal and is poled so as to be biased thereby in the conducting direction. As illustrated, adjustable resistors 19 and 21 may respectively be included in series and in shunt with diode 17 for a purpose which will be made apparent hereinafter. For the present, they may be regarded as if they were absent.

In the interest of definiteness of description, assume that an input signal 23 is applied across input terminals 5 via a linear amplifier 25 and is required to be logarithmically translated. The resultant output signal will appear between collector terminal 15 and ground, and may be coupled via a capacitor 27 and a linear amplifier 29 to a pair of terminals 31 where it is available for utilization. With the illustrated triangular waveform of input signal 23, logarithmic translation will result in an output signal 33 across the output circuit of transistor 3*a* and across terminals 31 having a waveform substantially as illustrated. To achieve such translation, means are provided connected to transistor amplifier 3 for controlling the portion of the nonlinear resistance characteristic of diode 17 over which its resistance actually varies in response to a predetermined amplitude range of the input signal. Such means are particularly illustrated as resistors 9 and 11, the latter being preferably about one-tenth or less of the resistance of the former. Accordingly, resistor 9 enables virtually independent control of the emitter bias current of transistor 3*a* and so of the quiescent current through diode 17 when the input signal voltage is at a reference potential level such as ground. This sets the value of the initial resistance of diode 17 on its nonlinear resistance characteristic curve. The signal current through diode 17 resulting from a selected amplitude of the input signal voltage relative to the reference level may then be controlled virtually independently by adjustment of resistor 11. This establishes the degree to which the diode resistance will change along its resistance characteristic for an input signal of that amplitude.

The signal-translating circuit of FIG. 1 may also comprise circuit means connected in the output circuit of amplifier 3 for modifying the nonlinear resistance characteristic produced thereacross by diode 17 in controllable degree. Such means may take the form of adjustable series and shunt resistors 19 and 21. Increasing the resistance of series resistor 19 will reduce the nonlinearity of the over-all signal-translation characteristic when the diode current would otherwise be large, corresponding to large input signal amplitude levels. The effect on the waveform of amplified output signal 33 would then be somewhat as shown by modified waveform 33*a* in FIG. 1. On the other hand, reducing the resistance of shunt resistor 21 from an initially substantially open-circuited condition will reduce the nonlinearity of the over-all signal-translation characteristic of the circuit at low amplitude levels of the input signal. The corresponding effect on amplified output signal 33 would then be somewhat as shown by waveform 33*b*. It is thus apparent that the shape of the over-all nonlinear signal-translation characteristic is controllable to obtain various departures from the nonlinearity of diode 17 alone.

*Operation of Circuit of FIG. 1*

Figure 2:
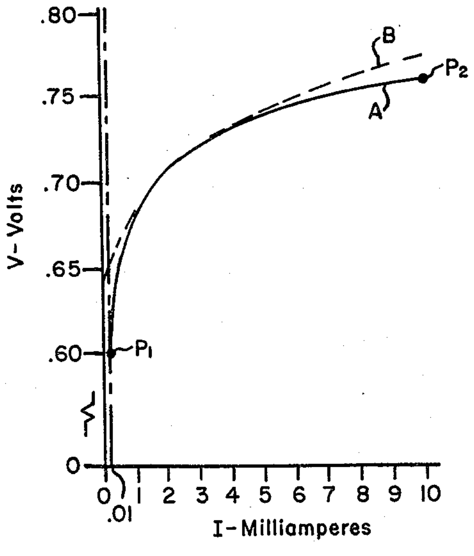
FIG. 2 shows voltage versus current curves illustrating two different nonlinear resistance characteristics which are obtainable by means of the circuit of FIG. 1.

The principles employed in the operation of the circuit of FIG. 1 may be understood by referring to the nonlinear resistance characteristic of a typical semiconductor PN junction as illustrated in FIG. 2. Such a junction may be provided by a semiconductor diode, or may equally well be obtained between the emitter and base or collector and base terminals of a junction transistor. The illustrated characteristic may be described analytically by the relationship $$I=I_0(e^{\frac{qV}{KT}}-1) \qquad (1)$$

where I is the current through the junction, V is the voltage across it, $I_0$ is the saturation current, T is the absolute temperature, and $q$ and K are known physical constants. The saturation current $I_0$ is the junction current when the voltage V is slightly negative, since the value of $$e^{\frac{qV}{KT}}$$

is then virtually zero. The value of $I_0$ is determined by the semiconductor material and the physical geometry of the junction, and increases exponentially with rising temperature. Equation 1 may be put in the form $$V=\frac{KT}{q}[1n(I+I_0)-1nI_0] \qquad (2)$$

If $I>>I_0$, this becomes $$V=\frac{KT}{q}(1nI-1nI_0) \qquad (3)$$

which is a true logarithmic relation between V and I. That is, a plot of V vs. $1n$I will be a straight line. Since, as stated above, the value of $I_0$ varies exponentially with temperature, the absolute magnitude of V for a given current I will vary widely at different temperatures. However, the change in V accompanying a given change in I is determined by the slope of the foregoing relation, or $$\frac{dV}{d(1nI)}=\frac{KT}{q} \qquad (4)$$

The value of $$\frac{KT}{q}$$

varies quite slowly with respect to temperature. Consequently, in spite of the temperature variation of the absolute value of V, the signal component thereof relative to a fixed reference voltage level resulting from a signal variation of the current I relative to a corresponding fixed reference current level will very nearly be a true logarithmic function substantially free of temperature effects. This is utilized to advantage in the circuit of FIG. 1 by the employment of alternating-current signal-transmission paths together with D.C. restoration or clamping of the voltage at the base of transistor 3*a*. That is, capacitor 7 blocks changes in the D.C. level of the voltage across input terminals 5, caused by drifts in preceding circuits from which it may be derived, from reaching the base of transistor 3*a*. At the same time, clamping circuit 13 serves to restore the correct D.C. level of that voltage at the base of the transistor. In a similar manner, capacitor 27 blocks changes in the D.C. level of the voltage across diode 17 from reaching the utilization terminals 31.

Now taking a specific example of application of the foregoing principles to the circuit of FIG. 1, assume that the amplitude of input signal 23 at transistor input terminals 5 covers a range of 100:1 relative to a zero or ground reference voltage level and that a logarithmic signal-translation characteristic is desired. That is, it must be of the form $$V_2=A \log V_1 \qquad (5)$$

where $V_1$ and $V_2$ are the input and output signal voltage amplitudes and A is a constant. This corresponds to a signal-translation gain characteristic of the form $$\frac{dV_2}{dV_1}=\frac{A \log e}{V_1} \qquad (6)$$

so that the required signal gain is inversely proportional to the input signal amplitude. A 100:1 change in gain is therefore required to obtain a logarithmic characteristic over the foregoing 100:1 input signal amplitude range. In addition, the fact that the signal gain is a function of signal amplitude makes it necessary to establish an output signal voltage reference level corresponding to the input signal reference level. In other words, the correct constant direct component of the input signal at terminals 5 must be included in the waveform actually reaching the base of transistor 3*a*. To do this, while still retaining the described improvement in temperature stability obtainable by isolating variations in that component from diode 17, capacitor 7 and the clamping or D.C. restorer circuit 13 have been included in the input circuit of FIG. 1. A D.C. restorer arrangement may simply comprise a diode which is grounded at its negative electrode, thereby establishing ground as a fixed reference potential level in the input circuit of transistor 3*a*. Alternatively, as illustrated, a gated clamp may be used to establish such a reference potential level. The clamping arrangement will provide better voltage control, and may include a transistor 13*a* having its emitter connected to the base of transistor 3*a* and its collector grounded. The base of transistor 13*a* may be gated by a pulse waveform 13*b* which maintains transistor 13*a* nonconducting except during the cyclically recurring gating pulse intervals. Waveform 13*b* can very conveniently be obtained when the circuit of FIG. 1 is employed in a system which includes cathode-ray tube scanning means, since it is the same as the blanking pulse waveform which is generated for turning off the scanning beam during each retrace interval.

Since the voltage V across a semiconductor PN junction diode is a logarithmic function of the junction current, a signal-translation characteristic of the type specified by Equation 5 above may be achieved by establishing a current I through the junction proportional to the input signal $V_1$. Such a current supply is provided by the circuit of FIG. 1, since the output impedance at the collector of a junction transistor such as transistor 3*a* will be of the order of one-hundred times the highest incremental resistance of diode 17. This highest diode resistance will obtain when the diode current is a minimum. If the minimum current is set by resistor 9 to be, for example, 0.1 milliampere when the input signal voltage has a selected unit amplitude, the diode resistance will typically be about 250 ohms. For an input signal voltage range of 100:1, as suggested, the maximum diode current will then be about 10 milliamperes. The corresponding incremental diode resistance $$\frac{dV}{dI}$$

may be derived from Equation 6, since $$\frac{dV_2}{dV_1}=B\frac{dV}{dI}=\frac{A\log e}{I} \tag{7}$$

and so $$\frac{dV}{dI}=\frac{\frac{A}{B}\log e}{I} \tag{8}$$

where B is the constant of proportionality applicable to $V_1$ in relating it to the diode current I. Equation 8 shows that the diode incremental resistance is inversely proportional to the current therein, so that the minimum incremental resistance will be about one-hundredths of the maximum resistance of 250 ohms, or just 2.5 ohms.

For proper operation of clamping circuit 13 it is important that the input impedance at the base of transistor 3*a* be very much greater, of the order of 2000 times the impedance of the clamping circuit. If this is not true, the D.C. reference level at the base may drift. The requisite high base impedance is established by the emitter current degeneration due to the presence of resistors 9 and 11. This effect is well known in the transistor art, and results in a base input impedance approximately equal to the net emitter resistance produced by resistors 9 and 11 multiplied by the collector-base current gain factor. Since this factor is commonly of the order of 40, an effective emitter resistance even as low as 100 ohms will still maintain an adequate input impedance. With a typical emitter resistance of the order of 500 ohms it follows that even wide variation of resistors 9 and 11 to attain a required nonlinear signal-translation characteristic will not disturb the requisite impedance condition.

The nonlinear resistance characteristic of a typical PN junction diode is shown by Curve A in FIG. 2. If the current range corresponding to a 100:1 signal voltage swing is from 0.1 to 10 milliamperes, as suggested, the corresponding change in diode voltage is found to extend from about 0.6 volt to 0.76 volt. The starting and terminating points of the portion of the diode nonlinearity which will enter into the nonlinear transfer characteristic of the circuit of FIG. 1 are therefore determined, and have been marked $P_1$ and $P_2$ on Curve A in FIG. 2. As stated above, the corresponding incremental resistance values will be about 250 and 2.5 ohms, respectively.

Since a logarithmic characteristic such as that of Curve A in FIG. 2 is simply the inverse of an exponential signal-translation characteristic, it is obvious that either type of characteristic is obtainable with the circuit of FIG. 1. For example, by adjusting the circuit for an initial operating point of high current and reversing the polarity of the input and output signal voltages a substantially exponential rise in output signal level can be achieved. Alternatively, transistor 3*a* may be connected as an emitter follower, so that diode 17 is supplied from a substantially constant voltage source. The diode current will then be an exponential function of the input signal voltage.

If an arbitrarily nonlinear signal-translation characteristic other than logarithmic is desired, a close approximation can usually be established by selecting a suitable portion of the nonlinear resistance characteristic Curve A in FIG. 2. This will involve adjusting resistor 11 in FIG. 1 for a particular point on the curve at the maximum signal level and adjusting resistor 9 for the proper initial point at the lowest signal level, the two adjustments being set for the closest correspondence between the desired characteristic and that of Curve A over the complete signal range. Curve B in FIG. 2 is illustrative of a required nonlinear characteristic substantially different from that of Curve A. As drawn, the central region of Curve B closely approximates logarithmic Curve A, but is much more linear in the region below, about 1.5 milliamperes, and above, about 3 milliamperes. The departure of Curve B from Curve A shows that a reduction of resistance of about 400 ohms is necessary at the low end and an increase of resistance of about 1 ohms is necessary at the high end. Shunt resistor 21 may therefore be set at about 400 ohms, and series resistor 19 at 1 ohm. As a practical matter the determination of the proper resistance values may be facilitated by plotting the requisite characteristic on semi-log paper, the current axis (or the corresponding independent variable axis) being calibrated in logarithmic units.

In a similar way, a very good approximation to a wide variety of continuously nonlinear signal-translation characteristics may be achieved. In the event a degree of nonlinearity exceeding that of a logarithmic curve is necessary, two circuits as in FIG. 1 may be cascaded to give a log—log function of the input signal. Various feedback arrangements may also be employed to modify the described signal-translation characteristic. Such modifications will be apparent to those skilled in the art in light of the teachings set forth herein. In constructing the circuit of FIG. 1 it is important that the input impedance of linear amplifier 29 connected across the output circuit of transistor 3*a* be sufficiently high so it does not significantly shunt the nonlinear resistance established across the output circuit by diode 17 and resistors 19 and 21. It is therefore preferable, if a transistor is employed as amplifier 29, to have an emitter-follower input stage. In addition, it is important that linear amplifier 25 connected to the input circuit of transistor 3*a* have a relatively low output impedance in order not to increase the charge time constant of capacitor 7 when clamping circuit 13 operates to restore the reference voltage level at the base of transistor 3*a*. An emitter-follower output stage is therefore advantageous in amplifier 25. Using such an arrangement, illustrative specific circuit values of a successfully tested signal-translating circuit constructed in accordance with FIG. 1 are as follows:

| | |
|---|---|
| Voltage supply | +6 volts; −12 volts. |
| Diode 17 | Sperry silicon diode S–113. |
| Capacitor 7 | 0.1 microfarad. |
| Resistors: | |
| 9 | 15,000 ohms. |
| 11 | 470 ohms. |
| 19 | Zero. |
| 21 | Open-circuited. |

Resistors 19 and 21 were set as indicated because the tested circuit was employed to obtain a logarithmic signal-translation characteristic.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A signal-translating circuit comprising: an amplifier having an input circuit and an output circuit; alternating-current signal coupling means comprised in said input circuit for applying an input signal voltage to said amplifier to cause it to produce an output signal voltage across said output circuit; further means comprised in said input circuit for establishing a substantially constant reference signal voltage level; a resistive element connected across said output circuit and having a nonlinear resistance characteristic; means connected to said amplifier for controlling the portion of said nonlinear characteristic over which the resistance of said resistive element varies in response to a predetermined amplitude range of said input signal relative to said reference voltage level; and circuit means connected in said output circuit for modifying the nonlinear resistance characteristic produced thereacross by said resistive element in controllable degree; whereby said output signal will be a nonlinear modification of said input signal in accordance with a nonlinear signal-translation characteristic which is adjustable by said input and said output circuit control means.

2. A signal-translating circuit comprising: an amplifier having an input circuit and an output circuit; alternating-current signal coupling means comprised in said input circuit for applying an input signal voltage to said amplifier to cause it to supply a current substantially proportional thereto to said output circuit; further means comprised in said input circuit for establishing a substantially constant reference signal voltage level; a resistive element connected across said output circuit and having a nonlinear resistance characteristic such that the voltage across said element is substantially a logarithmic function of the current therein; circuit means connected to said amplifier for controlling the portion of said nonlinear characteristic over which the resistance of said resistive element varies in response to a predetermined amplitude range of said input signal relative to said reference voltage level; and additional circuit means connected in said output circuit for modifying the nonlinear resistance characteristic produced thereacross by said resistive element in controllable degree; whereby a signal voltage is produced across said output circuit in accordance with a nonlinear signal-translation characteristic which is adjustable by said two control circuit means.

3. A signal-translating circuit comprising: an amplifier having an input circuit and an output circuit; alternating-current signal coupling means comprised in said input circuit for applying an input signal voltage to said amplifier to cause it to supply a current substantially proportional thereto to said output circuit; further means comprised in said input circuit for establishing a substantially constant reference signal voltage level; a crystal PN semiconductor junction connected across said output circuit; circuit means connected to said amplifier for controlling the quiescent current supplied to said junction when said input signal voltage is at said reference level and for further controlling the signal current supplied to said junction when said input signal voltage has a predetermined amplitude relative to said reference level; and additional circuit means connected in said output circuit for modifying the nonlinear resistance characteristic produced thereacross by said resistive element in controllable degree; whereby a signal voltage is produced across said output circuit in accordance with a nonlinear signal-translation characteristic which is adjustable by said two control circuit means.

4. A signal-translating circuit comprising: a junction transistor amplifier having an emitter, a base, and a collector; said transistor having a signal input circuit connected across its base and emitter and a signal output circuit connected across its collector and emitter; alternating-current signal coupling means comprised in said input circuit for applying an input signal voltage to said amplifier to cause it to supply a current substantially proportional thereto to said output circuit; further means comprised in said input circuit for establishing a substantially constant reference signal voltage level; a crystal PN semiconductor junction connected across said output circuit; circuit means connected to said amplifier for controlling the quiescent current supplied to said junction when said input signal voltage is at said reference level and for further controlling the signal current supplied to said junction when said input signal voltage has a predetermined amplitude relative to said reference level; and additional circuit means connected in said output circuit for modifying the nonlinear resistance characteristic produced thereacross by said crystal in controllable degree; whereby a signal voltage is produced across said output circuit in accordance with a nonlinear signal-translation characteristic which is adjustable by said two control circuit means.

References Cited in the file of this patent

UNITED STATES PATENTS

| | | |
|---|---|---|
| 2,757,281 | Le Bel | July 31, 1956 |
| 2,787,717 | Kasmir | Apr. 2, 1957 |
| 2,863,069 | Campanella | Dec. 2, 1958 |
| 2,876,349 | Rogers | Mar. 3, 1959 |
| 2,890,352 | Goodrich | June 9, 1959 |
| 2,892,952 | McVey | June 30, 1959 |
| 2,896,168 | Thomas | July 21, 1959 |

OTHER REFERENCES

"A Square Root-Law Circuit," by Baxter, Electronic Engineering, March 1954, pages 97 and 98.